(12) United States Patent
Konstant

(10) Patent No.: US 6,468,015 B1
(45) Date of Patent: Oct. 22, 2002

(54) CONTAINER PICK AND RETURN SYSTEM

(75) Inventor: Anthony N. Konstant, Winnetka, IL (US)

(73) Assignee: Konstant Products, Inc., Skokie, IL (US)

( * ) Notice: Subject to any disclaimer, the term of this patent is extended or adjusted under 35 U.S.C. 154(b) by 48 days.

(21) Appl. No.: 09/841,987

(22) Filed: Apr. 25, 2001

(51) Int. Cl.[7] .............................. B65G 1/00; B65G 65/00
(52) U.S. Cl. .................. 414/276; 414/529; 193/35 MD
(58) Field of Search ................................ 414/276, 414, 414/529; 193/35 MD (56) References Cited

U.S. PATENT DOCUMENTS

| | | | |
|---|---|---|---|
| 1,558,014 A | * 10/1925 | Jaenicke | |
| 4,047,625 A | * 9/1977 | Grant | 193/35 MD |
| 4,485,910 A | 12/1984 | Tabler | |
| 4,604,022 A | * 8/1986 | Bourgraf | 254/120 |
| 4,613,270 A | 9/1986 | Konstant et al. | |
| 4,941,797 A | * 7/1990 | Smillie, III | 187/269 |
| 4,978,272 A | * 12/1990 | Leon | 193/35 MD |
| 5,224,828 A | 7/1993 | Lawless et al. | |
| 5,567,103 A | 10/1996 | Konstant | |
| 5,617,961 A | 4/1997 | Konstant et al. | |
| 5,642,976 A | 7/1997 | Konstant | |
| 5,873,472 A | * 2/1999 | Weisburn | 211/41.12 |
| 5,873,473 A | 2/1999 | Pater | |
| 6,186,725 B1 | 2/2001 | Konstant | |
| 6,379,097 B1 | * 4/2002 | Vondenhuevel et al. | 414/414 |

OTHER PUBLICATIONS

Creative Storage Systems, Inc., Kennesaw, GA, "ROLL N' LIFT" 3/97, pp. 1–7 and attachments.

* cited by examiner

Primary Examiner—Christopher P. Ellis
Assistant Examiner—Richard Ridley
(74) Attorney, Agent, or Firm—Niro, Scavone, Haller & Niro (57) ABSTRACT

A container pick and return system is provided having a two-tiered flow rail conveyor system that includes an inclined upper set of feed flow rails forming an input conveyor assembly and a lower set of inclined return flow rails forming an exit conveyor upon which a unit load may roll. At the front end of the system is a transfer conveyor assembly that receives a loaded container. The line worker may then operate a damper control pedal that permits the container to be positioned at any desired angle greater than the angle of the input conveyor. This permits enhanced accessibility of the contents of the container regardless of the height or arm length of the line worker or the size and shape of the container contents. When the container is emptied by the line worker, the transfer conveyor assembly is triggered and the empty container is automatically lowered and transferred to the exit conveyor where it rolls down the exit conveyor to the rear of the system for reloading. Upon transfer of the empty container, the transfer conveyor assembly automatically returns to an upper position for receipt of another loaded container and subsequent angular presentation of the contents of the container.

6 Claims, 7 Drawing Sheets

FIG. 7

CONTAINER PICK AND RETURN SYSTEM

BACKGROUND OF THE INVENTION

The present inventions relate generally to container return systems and, more particularly, to improved container pick and return systems that permit the efficient delivery of containers and their contents to an access aisle for easy and adjustable unloading and the automatic return of empty containers to a loading aisle. The present inventions are particularly advantageous when used in assembly line applications, such as the automotive industry. However, they are equally pertinent to a wide variety of other applications.

In assembly line applications, for example, an important consideration is the constant supply of parts, typically of a wide variety of sizes, shapes and weights, to the assembly line worker. Ease of access to these parts, the removal of empty parts containers, and the re-supply of parts are also important considerations to the overall efficiency of the process. Any delay in the flow of parts, any difficulty in access to parts or any difficulty in removing empty containers can lead to inefficiencies in the entire assembly line process.

Systems capable of accommodating these considerations are shown and described in U.S. Pat. No. 6,186,725 B1 to Konstant, entitled "Container Pick and Return System," U.S. Pat. No. 5,567,103 to Konstant and U.S. Pat. No. 5,642,976 to Konstant, both entitled "Unloading Device" (the "Konstant patents") (all of which are incorporated herein by reference).

The latter two Konstant patents teach, among other things, container unloading systems that selectively and automatically cycle carts carrying unit loads, such as containers or parts bins, to the front (or access aisle) of the system where the load is held at an angle for unloading. The system then cycles (returns) the carts and unloaded unit containers to the rear of the system (loading aisle) for re-loading and re-use. In other such systems, pallets or bins ride on pairs of parallel flow rails and carry the unit loads to the access aisle for use. The empty unit loads may then be selectively and automatically returned to the rear of the system for reloading.

The first referenced Konstant patent teaches, among other things, a container pick and return system having a transfer conveyor assembly that, upon receipt of a loaded container, automatically and smoothly positions the container at an angle increased from the angle of the input conveyor assembly to enhance the accessibility of the contents of the container. When the container is empty, the transfer conveyor assembly is selectively triggered and the empty container is automatically transferred to the exit conveyor for unloading.

Other available systems require the use of air cylinders, solenoids and motors to cycle unit loads. One such system is the Roll'n Lift system by Creative Storage Systems, Inc. of Kennesaw, Ga. Such devices utilize relatively complex electronics and pneumatics to present a pallet and return unloaded pallets and the like. Such systems also suffer from, among other things, their expense, complexity and high maintenance.

In some applications, it is desirable to eliminate the necessity of wheeled carts used to carry the unit loads. In this manner, there is greater flexibility of unit load size and systems costs, and associated maintenance and shipping costs, may be reduced. For similar reasons, it is also desirable to eliminate the need for and complexity of electronically controlled air cylinders, pneumatics and motors.

Moreover, it is also desirable to have an efficient and smooth system that can be effective with heavy loads and provide the gentle presentation of such loads to the transfer conveyor. Further, it is learned that many in the industry believe it is desirable for the operator or line worker to be able to selectively adjust the angle of presentation of a parts container or other load.

SUMMARY OF THE INVENTION

The present inventions preserve the advantages of container unloading and return systems and also provide new features and advantages. For example, the present inventions provide container unloading systems that can deliver unit loads, parts container bins and the like to an access aisle and smoothly present the loads at an operator selected angle of presentation for ease of access. The empty containers may then be automatically and selectively returned for refilling and another loaded container may automatically take its place. Such systems can accommodate a wide variety of load sizes, shapes and weights, including relatively heavy loads, all without the use of carts or complex electronically controlled pneumatics and the like.

In a preferred embodiment of the present inventions, a container pick and return system is provided having a two-tiered flow rail conveyor system that includes an inclined upper set of feed flow rails forming an input conveyor assembly and a lower set of inclined return flow rails forming an exit conveyor assembly upon which a unit load may roll. At the front end of the system is a transfer conveyor assembly that receives a loaded container. The line worker may then operate a locking spring control pedal that permits the container to be positioned at any desired angle greater than the angle of the input conveyor. This permits enhanced accessibility of the contents of the container regardless of the height or arm length of the line worker or the size and shape of the container and its contents. When the container is emptied by the line worker, the transfer conveyor assembly is triggered and the empty container is automatically lowered and transferred to the exit conveyor where it rolls down the exit conveyor to the rear of the system for reloading. Upon transfer of the empty container, the transfer conveyor assembly automatically returns to an upper position for receipt of another loaded container and subsequent presentation of the contents of the container. A transfer trigger mechanism is provided to enable the selective transfer and return of unloaded containers through the activation of the transfer function. In addition, a container stop may be provided on the input conveyor so that a number of containers may wait in line behind one another in multiple depths on the input conveyor to be selectively advanced to the transfer conveyor assembly for use.

Accordingly, an object of the present invention is to provide a unit load unloading conveyor system that automatically returns empty containers, unit loads, pallets and the like to the rear of the system for reloading.

Another object of the present invention is to provide a transfer and return system that minimizes interference with the efficiency of the assembly line process by providing a steady stream of parts to the assembly line worker.

A further object of the present invention is to provide a smooth container return system that is effective for heavy loads and does not require the use of wheeled carts.

An additional object of the present invention is to provide a container unloading system that smoothly presents the contents of a container at an angle, that selected by the operator, for ease of use and unloading and then smoothly, selectively and automatically transfers the unloaded container to the rear of the system.

Still another object of the present invention is to use locking gas springs and dampers in a container unloading system that smoothly and gently effectuates container presentation and transfer, which is also applicable for use with a wide variety of load weights, including heavy loads.

Still a further object of the present invention is to provide a container unloading system that automatically, selectively and smoothly transfers unloaded containers from an unloading end to a loading end where they may be stored or re-used.

Yet an additional object of the present invention is to eliminate the need for solenoids, motors and the like for a container unloading and return system, although such items may be used on or in conjunction with systems of the present invention.

Yet another object of the present invention is to provide a container unloading system that can accommodate multiple depths of containers and a wide variety of container contents.

Yet a further object of the present invention is to provide an unloading system that can be used in combination with other such systems and that can be used in conjunction with other transfer of storage and/or delivery systems.

INVENTOR'S DEFINITION OF THE TERMS

The terms used in the claims of this patent as filed are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

These and other features, objects and advantages will become apparent from the following descriptions and drawings wherein like reference numerals represent like elements in the various views, and in which.

DETAILED DESCRIPTION OF PREFERRED EMBODIMENTS

Set forth below is a description of what is currently believed to be the preferred embodiment or best representative example of the inventions claimed. Future and present alternatives and modifications to this preferred embodiment are contemplated. Any alternatives or modifications which make insubstantial changes in function, in purpose, in structure or in result are intended to be covered by the claims of this patent.

A container unloading or unit load pick and return system in accordance with a preferred embodiment of the present inventions is shown generally in the Figures. By reference to FIGS. 1–4, the overall system includes a two-level flow rail conveyor assembly 20; a transfer conveyor assembly 22; and, a support structure 24. Each of these system components, as well as the operation of the overall system, will be described below with particular reference to assembly line applications using containers or parts bins. However, it will also understood that the present inventions may be used in a large number of other applications. In addition, the present inventions are applicable to pallets, slip sheets and unit loads.

The support structure 24 is designed to support the flow rail conveyor system assembly 20 and the transfer conveyor assembly 22. Support structure 24 includes a number of spaced parallel columns 30, support braces (not shown) and a number of beams (not shown) interconnecting the spaced parallel columns 30. The resulting configuration is generally similar to storage bays. Also provided are top frame members 36, bottom frame members 38 and lower cross-frame members 40 (see also FIG. 5). Base brackets 37 (see also FIG. 5) may be provided which may be used to, among other things, accommodate the pivotal attachment of various components of the transfer conveyor assembly 22, as hereinafter described. In addition, in a preferred embodiment of the present invention, support structure 24 includes spaced, parallel, front guide columns 39. Guide columns 39 are formed by opposing tubular members. Guide columns 39 serve as guides for various components of the transfer conveyor assembly 22, as hereinafter described.

It will be understood that any number of support structures 24 may be placed in side-by-side relationship, or even stacked one on top of the other, also depending upon the application. Depending upon the design load, any necessary support can be provided by additional or larger columns, beams and the like, which may be attached in any variety of ways such as bolts, welding and the like. In addition, generally tubular structural members are used for the majority of the components of a preferred embodiment of the support structure 24, as well as many of the components of the transfer conveyor assembly 22, as shown, in the Figures. Such members provide the preferred strength and torsional and stiffness characteristics of the preferred embodiment. However, a wide variety of cross-sectional shapes, such as cold-rolled I and S beam cross-sections, may also be used for the support structure and other components of the present inventions.

With reference to FIGS. 1–4, conveyor rail system 20 is supported by support assembly 24. In a preferred-embodiment of the present invention, conveyor rail system 20 consists of a pair of spaced, parallel input flow conveyors 21 and a pair of spaced, parallel exit return flow conveyors 23. As will be understood by those of skill in the art, the input 21 and return 23 flow conveyors may be formed from a series of in-line rollers that define rolling surfaces which permit a container, pallet or unit load to roll along their length. In the preferred embodiment, a pair of input 21 and exit 23 conveyors are utilized. However, depending upon the type of container or unit load for which the system is designed, as well as the design loads, one or any number of additional flow conveyor assemblies may be used. Alternatively, a single flow conveyor assembly may be used for the input 21, exit 23 and/or transfer conveyor 25.

Input conveyors 21 are sloped gradually downward from the rear to the front of the system and return conveyors 23 are sloped downward from the front to the rear of the system. The forward end of input conveyor 21 and return conveyor 23 terminates before the front end of the system in order to accommodate the transfer conveyor assembly 22. In addition, and of particular utility in multiple container applications, a container release mechanism 100 (see also FIGS. 6 and 7) may be placed on or cooperate with the input conveyor 21 to enable the selective release of containers to the transfer conveyor assembly 22. One example of a suitable container or other unit load release assembly 100 is shown and described in U.S. Pat. No. 5,873,472, entitled "Release Mechanism for Carts, Pallets or Unit Load Storage System," which issued to John F. Pater and was assigned to Konstant Products, Inc., and which is incorporated herein by reference. Such a release may be readily utilized with the present inventions and is shown generally as 100 in FIGS. 1 and 3. Container release assembly 100 is activated through release handle 102. Specifically, when, release handle 102 is pulled, it forces a generally horizontal link 104 forward which rotates a generally vertical link 106 forward. This enables selective activation of the container stop 100 (see FIGS. 6 and 7).

In addition, retarders or brakes (not shown) may be incorporated along the input conveyor 21 in order to slow the flow of and separate any containers in the system, especially when multiple depths of containers are utilized. The type and incorporation of retarders or brakes in the present invention will be understood by those of ordinary skill in the art. In general, however, such retarders may take the form of a large rubber roller having a centrifugal brake assembly, the surface of which contacts the bottom of a roller which is in contact with the unit load or container. In this manner, among others, the flow of containers may be slowed and desired spacing maintained between containers.

The preferred transfer conveyor assembly 22 of the present inventions may be better understood by reference to FIGS. 1–4. The assembly 22 consists of a container deck 50 which may be constructed from a number and variety of structural members, including side deck members 51. As will be hereinafter described, container, deck 50 may be used to accommodate some of the other components of the transfer conveyor assembly 22. Container stops 85 are provided at the front of container deck 50. Attached to container deck 50 are transfer flow conveyors 25. Transfer flow conveyors 25 are in line with the input flow conveyors 21 to receive a container or other load. The transfer flow conveyors 25 then move with container deck 50 during the parts presentation and transfer modes as hereinafter described.

Container deck 50 is adapted to receive deck struts 56, which extend downwardly toward bottom frame members 38. Specifically, in a preferred embodiment, deck struts 56 are pivotably connected at their proximate end to container deck 50 using tabs 57 or similar methods and configurations. Stabilizer bars 58 (FIG. 5) may also be provided to ensure that deck struts 56 rotate the same amount when the system is under load and in operation. The distal ends of deck struts 56 are adapted to rollingly engage bottom frame members 37. In a preferred embodiment, the distal ends of deck struts 56 are adapted to accommodate wheels or rollers 59. Wheels 59 cooperate with locking spring control assembly 70, as hereinafter described. Alternatively, the distal end of the deck struts 56 may be adapted to slide or otherwise move along base brackets 37 or the ground and the like.

Container deck 50 is also designed to accommodate guide sleeves 60, which in a preferred embodiment of the present inventions are pivotably connected by well known means to side deck members 51. Guide sleeves 60 are designed to collar and slidably engage guide column 39. Guide sleeves 60 are also provided with tabs or other means to permit the attachment of other components of the transfer conveyor assembly 22, as hereinafter described. In this manner, and in conjunction with deck struts 56, container deck 50 is kept in proper alignment throughout its range of operation during container transfer and parts presentation.

Figure 5:
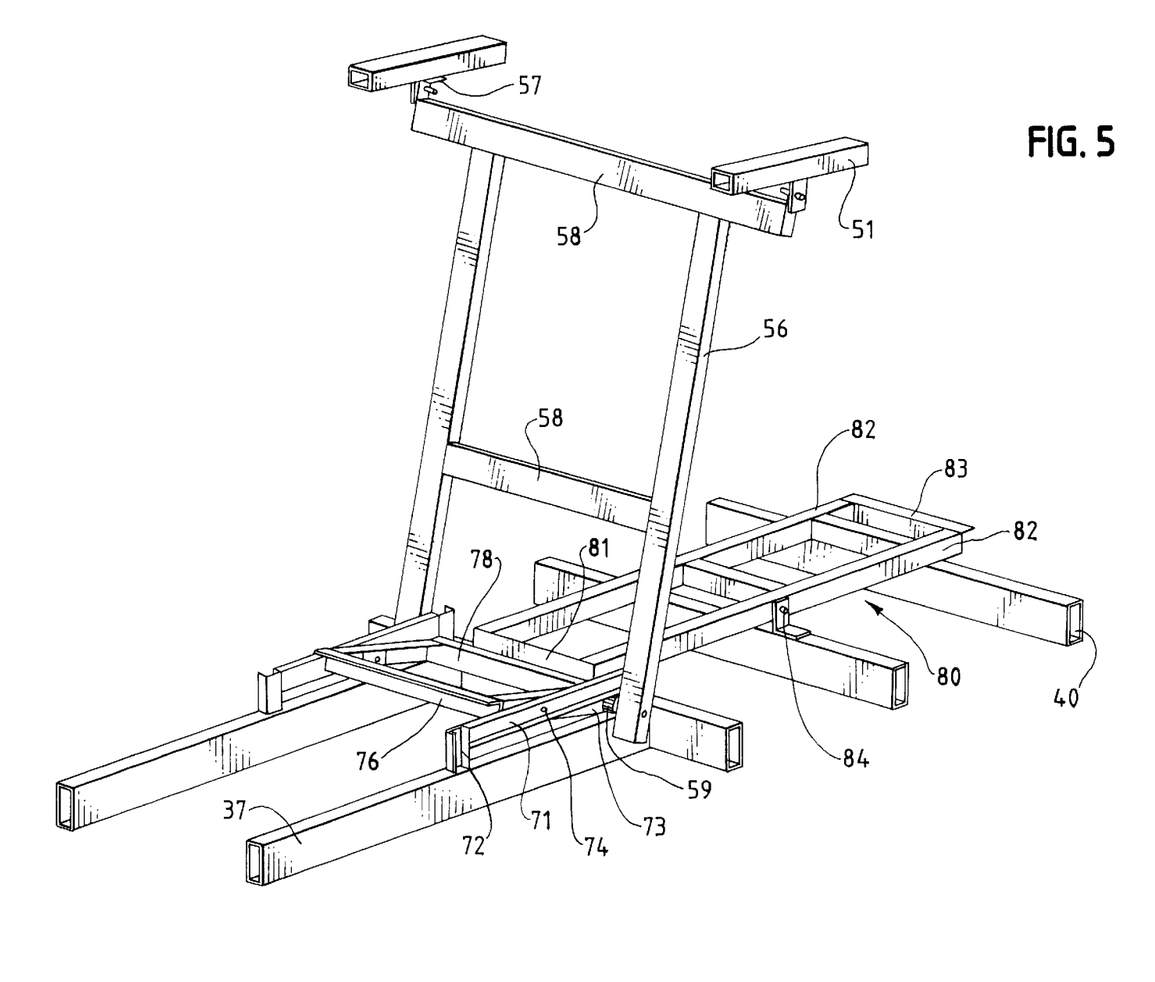
FIG. 5 is a perspective schematic view of portions of a representative transfer trigger mechanism component of a preferred embodiment of the present invention shown in an entry or feed position.

With particular reference to FIG. 5, deck struts 56, and hence container deck 50, are held in the entry position (see also FIG. 1) by trigger mechanism 70, which also serves to permit the selective activation of the transfer assembly 22. Trigger mechanism 70 consists of horizontal bracket member 71 and vertical bracket member 72, both of which serve as the frame structure for trigger lever 73. Horizontal bracket member 71 is connected at its front end (not shown) and at its rear end to vertical bracket member 72, which in turn is connected to bottom frame member 37. Trigger lever 73 is pivotably mounted to horizontal bracket member 71 by pins 74 or other well known means. In addition, trigger lever 73 is operably connected to or in contact with a front stop bracket 78 and a rear stop bracket 76 (see FIG. 5), which, in a preferred embodiment, for one generally rectangular assembly.

In situations where multiple container pick and return systems are used side-by-side in rows, it is particularly helpful to position the means for activation of the trigger mechanism 70 on the front of the system. One way to accomplish this is to provide a strut stop release 80 having an engagement end 81 and an activation end 83 which are interconnected by two lateral members 82. The activation end 83 extends out of (or is accessible from) the front of the system. When transfer is desired, the operator may simply step on activation end 83 or other member causing the two lateral members 82 to pivot about point 84 and thereby rotate and activate the trigger lever 73. Other means will be readily understood by those of skill in the art as dictated by the actual use and set-up of the system.

Deck support arms 56, and their wheels 59, are placed so that they may roll rearward along bottom bracket members 37. The front end of trigger lever 73 engages stop wheel 60 when the transfer assembly 22 is in the pick position and the trigger mechanism 70 is in the stop position, as shown in FIG. 5. When transfer of an empty container is desired, the forward end of trigger lever 73 is activated by stepping on activation end 83 of strut stop release 80. As a result, engagement end 81 rotates upward and contacts front stop bracket 78. Upon activation, trigger lever 73 disengages from wheel 59, which enables wheel 59 to roll rearward along bottom bracket member 37 and effectuates transfer, as hereinafter described.

In a preferred embodiment, at least one or more, but preferably two, gas dampers 64 are provided as part of the transfer conveyor assembly 22. The dampers 64 are connected at one end to guide column sleeve 60 through tab 68 or other well known means. The other end of gas dampers 64 is angled downwardly from side members 51 and attached to bottom frame member 38 through tabs 65 or other well known means. The dampers 64 help control the descent of the loaded container deck for smooth presentation, as well as supporting a portion of the load.

At least one, and preferably two, locking gas springs 66 are also provided as part of transfer conveyor assembly 22. Locking gas springs 66 are connected at one end to column sleeve 60 through tab 69 or other well known means, and pivotably mounted to bottom frame member 38 through tab 67 or other well known means. Locking gas springs 66 aid in controlling the descent of container deck 50 during parts presentation and transfer, serve to return the deck to its upper or loading position after completion of transfer and enable the selective angular presentation of transfer deck 50 and a container. The placement of locking gas springs 66 and gas dampers 64 may be adapted to provide smooth and effective operation depending upon the design load of the system and may be readjusted for different loads.

Alternative arrangements of the locking gas springs 66 and gas dampers 64 may be utilized. For example, only one of each may be utilized. And, the locking gas springs 66 and gas damper 64 may be configured in a manner other than that of the preferred embodiment to achieve smooth and efficient transfer, as discussed herein.

The preferred locking gas springs 66 are presently available from Hahn Gas Springs of Aichschieb, Germany; namely, its gas spring model number S14 40 650 1 1700 GZ25 WG45 1400 N/5/6/7. Although other types and makes of gas springs may be used in the present invention, these gas springs provide the best operation and adjustability of the spring factor or constant, as well as presentation angle, adjustability and selectivity. Similarly, gas dampers 64 are presently available from Hahn Gas Springs; namely, its model number D14 40 750 2 1630 WG35 001 N/6. Other suitable gas dampers that provide controlled action that can handle the designed load and control the descent of the load may be used.

A locking gas spring control mechanism shown generally at 90 in FIGS. 1–4 is also provided. Locking gas spring control mechanism 90 includes a foot pedal 91 (or other means) that is operably connected to L-shaped pin 95 through link 92. Pin 95 is in turn operably connected to valve 96 of locking gas spring 66. Thus, when desired, foot pedal 91 may be activated which rotates valve 95 and permits locking gas spring 66 to compress (descend). This then permits the front end of container deck 50 to drop downward (see FIGS. 2 and 3). The desired angle of presentation is controlled by depressing pedal 91 for longer periods (i.e., permitting a greater angle of presentation, FIGS. 3 and 4) or a shorter period (i.e., a smaller angle of presentation, FIG. 2). In this manner, almost infinite adjustments of the angle of presentation may be achieved.

Figure 1:
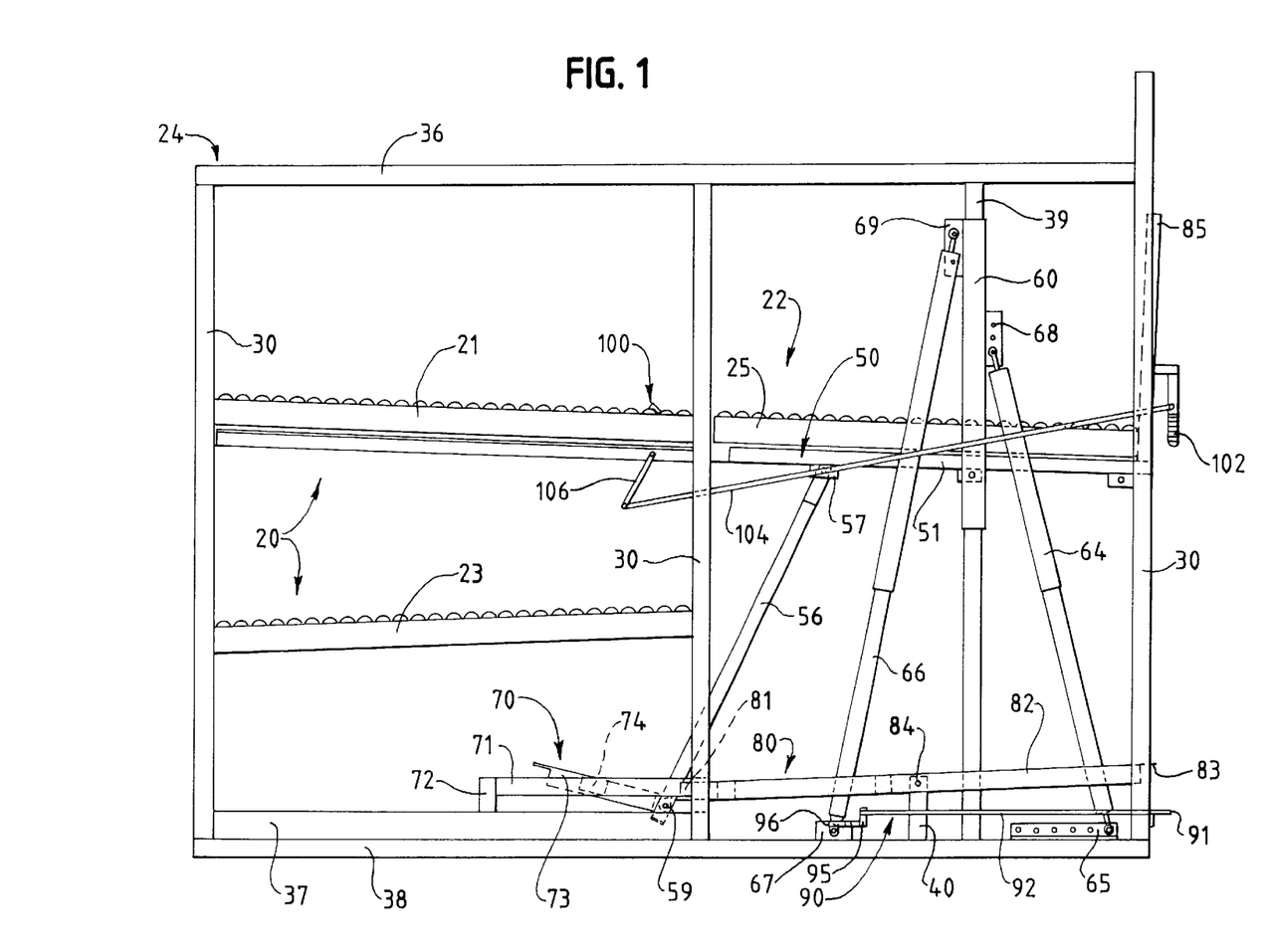
FIG. 1 is a side schematic view of a preferred embodiment of the present invention shown with the transfer conveyor assembly in an upper or container entry position.
Figure 2:
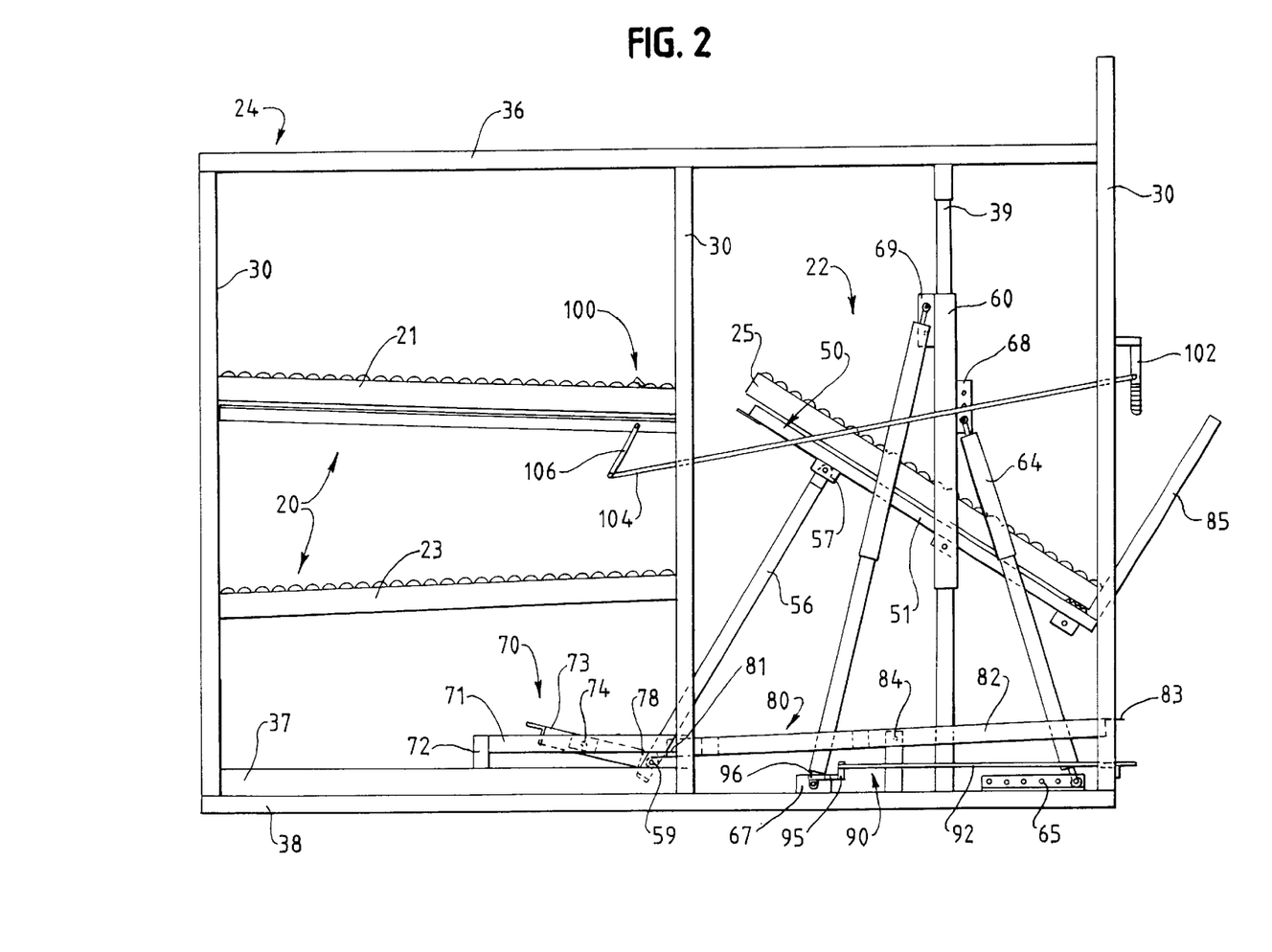
FIG. 2 is a side schematic view of a preferred embodiment of the present invention of FIG. 1 with the transfer conveyor assembly in a container pick or unloading position.
Figure 3:
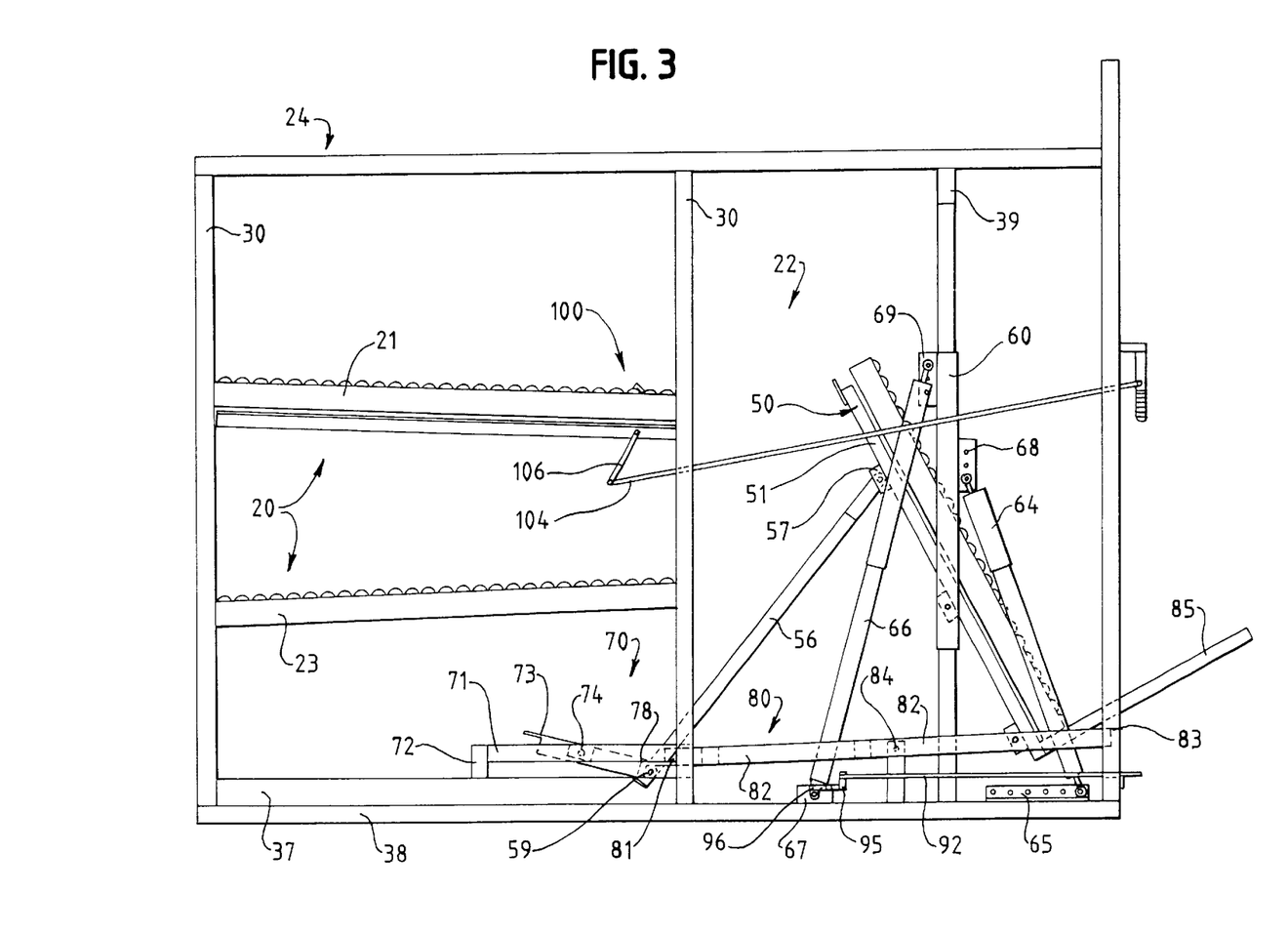
FIG. 3 is a side schematic view of a preferred embodiment of the present invention of FIG. 1 with the transfer conveyor assembly in an increased angle container pick or unloading position.
Figure 4:
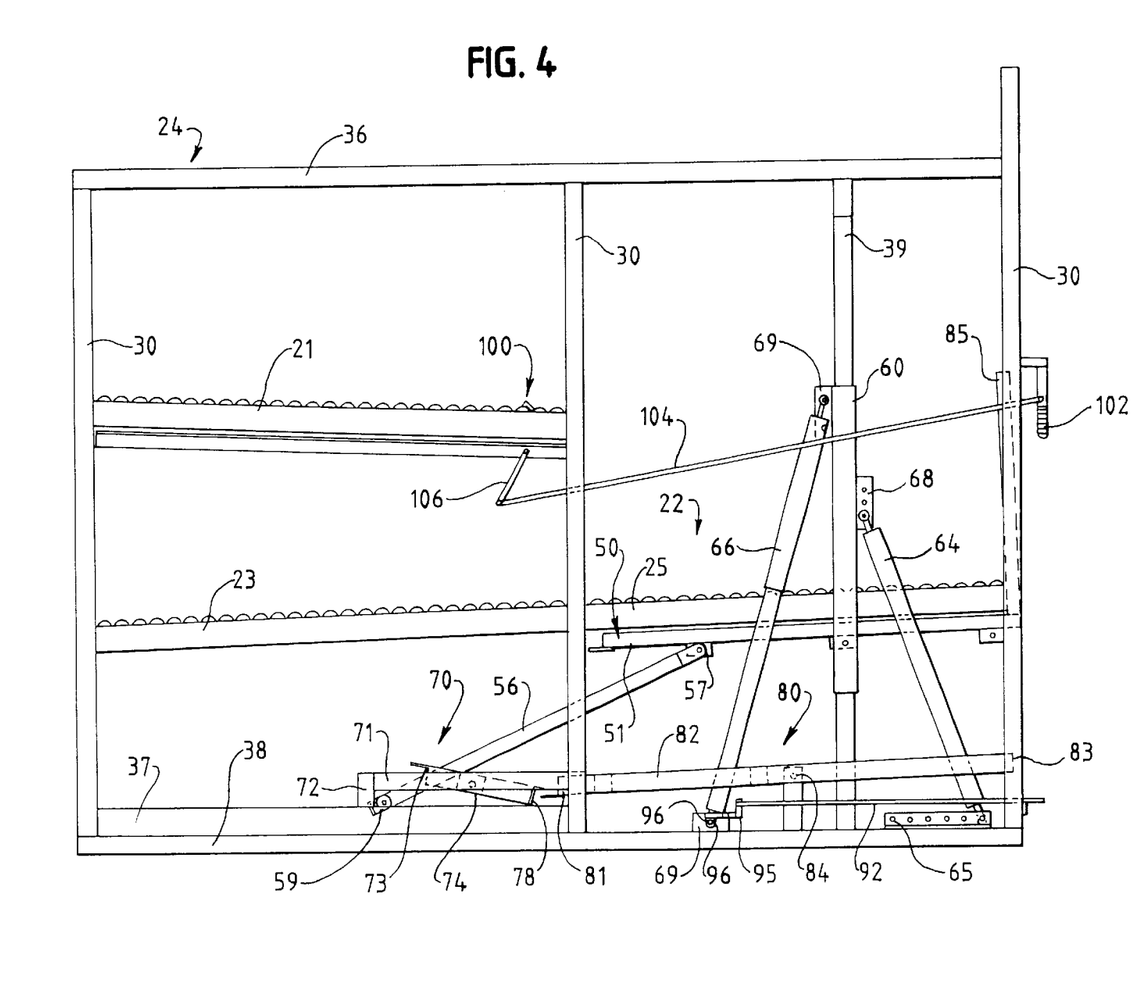
FIG. 4 is a side schematic view of a preferred embodiment of the present invention with the transfer conveyor assembly in a lowered or container return position.
Figure 6:
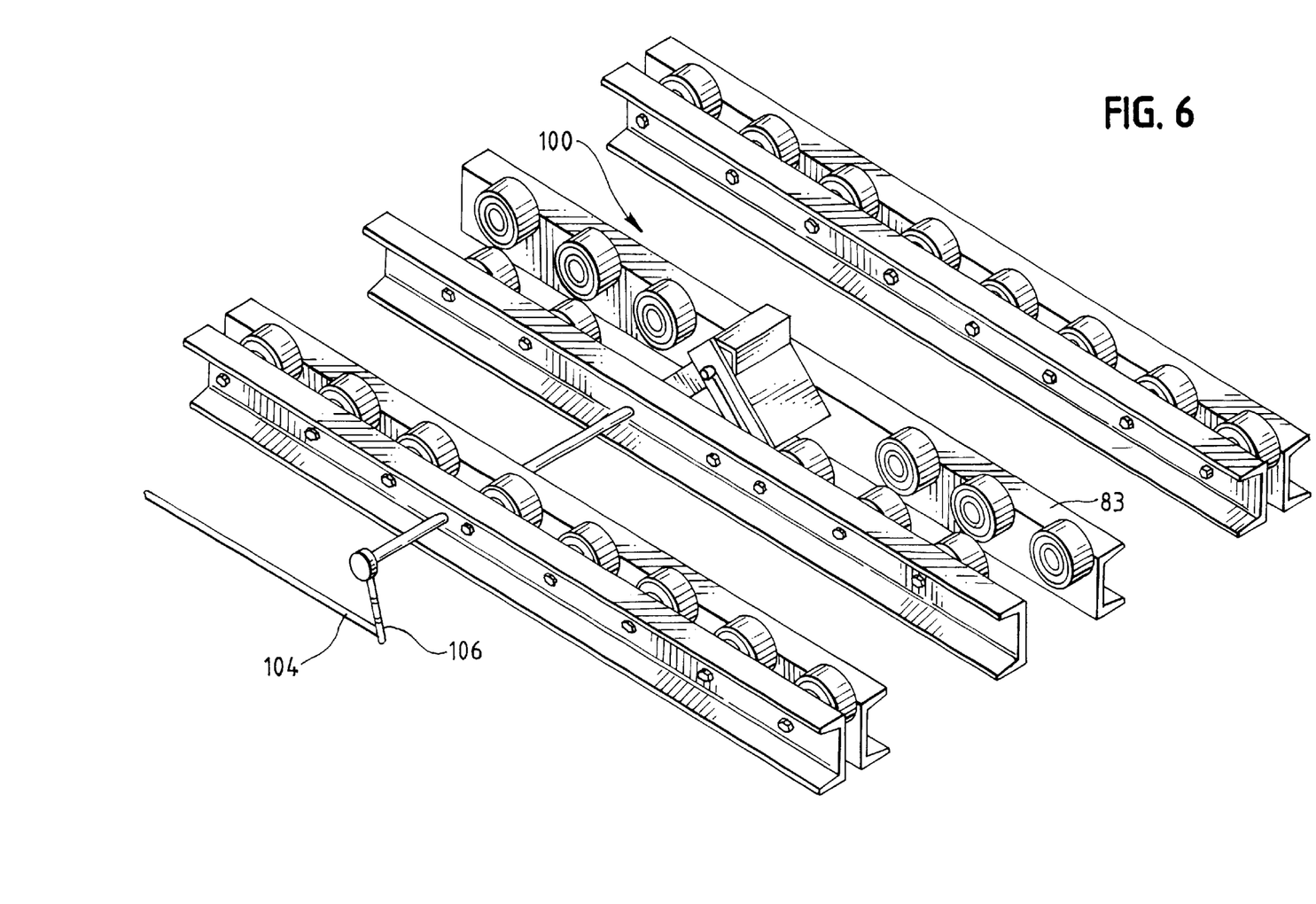
FIG. 6 is a perspective view of a preferred embodiment of a container release mechanism of the present invention shown in a locked or stop position; and, FIG. 7 is a perspective view of a preferred embodiment of a container release mechanism of the present invention shown in an open or release position.
Figure 7:
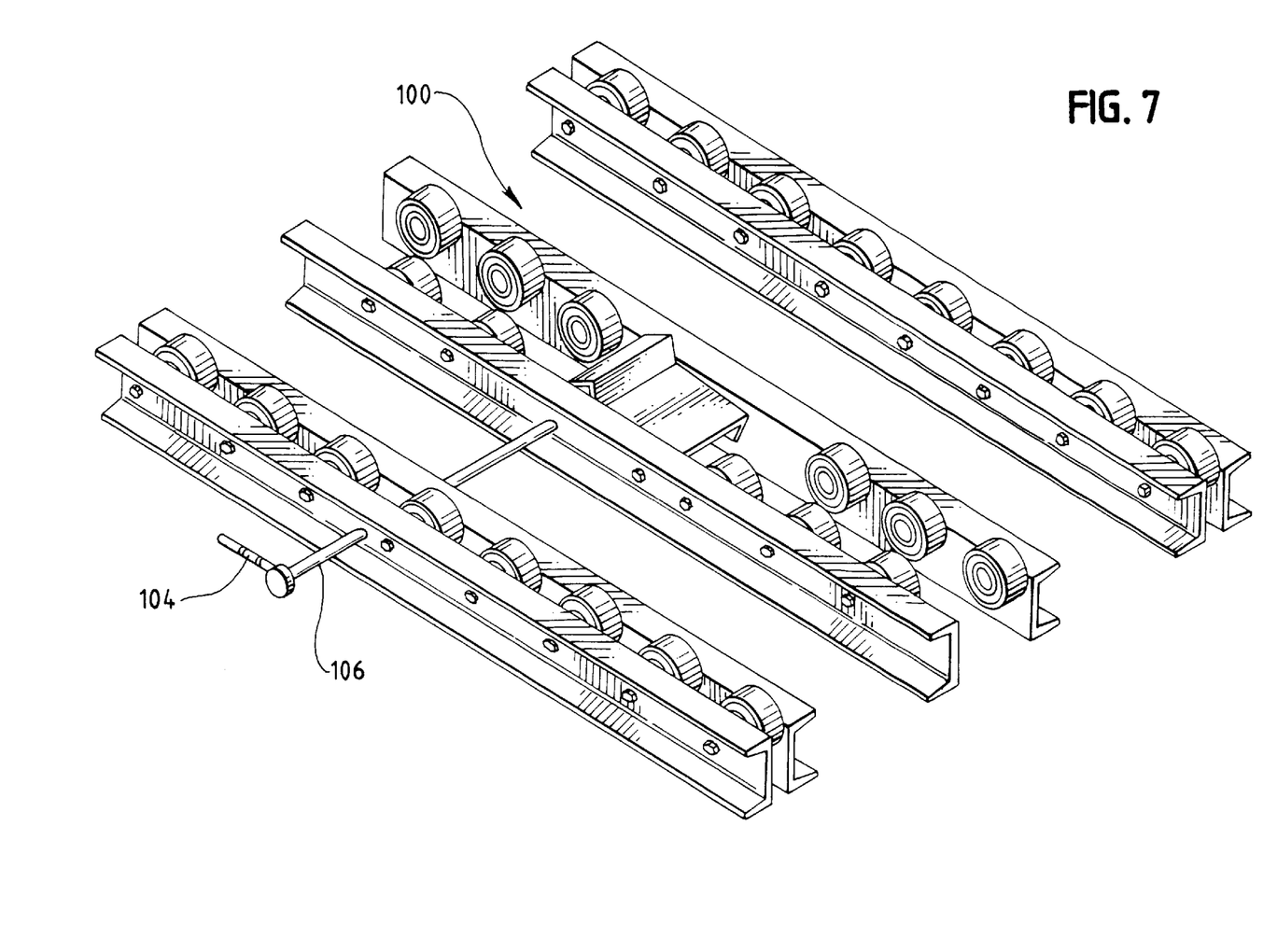

The operation of a preferred embodiment of the present invention may be better understood by reference to FIGS. 1–3. The entry position is shown in FIG. 1. A loaded container or parts bin (not shown) is placed on the rear end of input conveyor assembly 21. As previously described, retarders may be used on the input conveyor 21. If container release mechanism 100 is employed along input conveyor 21, container will be engaged (FIG. 6). Upon any such release through activation of handle 102 (FIG. 7), the container rolls forward onto transfer conveyor 25 until it comes into contact with container stop 85. When desired, locking spring control 90 may be activated by stepping on foot pedal 91. The activation of locking gas spring 66 and the weight of the container forces the front end of container deck 50 downward to present the parts at any desired unloading and use angle. Dampers 64 and. locking gas spring 66 counteract some of the weight and slowly and smoothly lower the load to the desired angle. Guide columns 39, in conjunction with column sleeves 60, keep the container deck assembly in proper alignment upon descent and return.

Once the container is unloaded and the container collapsed, if necessary, trigger mechanism 70 is activated by depressing the activation end 83 of strut stop release 80 which activates trigger lever 73. As a result, stop wheel 59 is disengaged from trigger lever 73 and the wheels 59 of deck strut 56 roll rearward on bottom members 37. The front and rear of transfer conveyor assembly 22 and container deck 50 ease downward so that the empty container may roll down transfer conveyor 25 and onto exit conveyor 23. Once the empty container clears the transfer conveyor 25 and rolls toward the rear of the system, gas springs 66 counteract the weight of the transfer conveyor assembly 22, and push the assembly up into the input position and ready to receive the next container. In this manner, smooth and efficient transfer of, for example, parts bins is accomplished.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

what is claimed is:

1. A unit load pick and return system, comprising:
an inclined input conveyor assembly;
an inclined exit conveyor assembly located below said input conveyor;
a transfer conveyor assembly having a front end and a rear end, said front end adjustably movable downward to enable the unit load to be presented at an angle greater than the angle of inclination of the input conveyor for unloading;
said rear end movable downward to a position below said front end and in alignment with said exit conveyor to form a downwardly directed incline that selectively and automatically transfers an unloaded unit load carrier from the input conveyor assembly to the exit conveyor assembly; said front and rear end joints moveable upwardly to return the transfer conveyor assembly to a position in alignment with said input conveyor assembly to receive a unit load from the input conveyor assembly;
at least one selectively operable locking gas spring to enable the selective movement of said front end to position said unit load at any desired angle of inclination greater than the angle of inclination of the input conveyor assembly; and,
a locking spring control assembly to selectively permit the operation of said locking gas spring.

2. The invention of claim 1 wherein the transfer conveyor assembly includes a guide sleeve to keep the transfer conveyor assembly in proper alignment throughout its range of operation.

3. The invention of claim 2 wherein a trigger mechanism is provided to cooperate with a deck strut which is provided as part of the transfer conveyor assembly.

4. The invention of claim 3 wherein the transfer conveyor assembly includes a stop to keep the unit load from rolling off of the transfer conveyor assembly upon presentation and transfer of the unit load.

5. The invention of claim 4 wherein the input conveyor assembly includes a unit load release to permit the selective advancement of unit loads to the transfer conveyor assembly.

6. A container unloading and return system comprising:

input conveyor means for delivering the loaded container to the front of the system exist conveyor means for returning an unloaded container to the rear of the system;

transfer conveyor means for selectively presenting a loaded container for unloading, the transfer of an unloaded container to the exit conveyor means, and the return of the transfer conveyor means to a position to receive a loaded container from the input conveyor means; and, a locking gas spring control means to selectively permit the operation of a locking gas spring to enable the selection of a desired presentation angle.

\* \* \* \* \*